United States Patent [19]
Cather, Jr. et al.

[11] Patent Number: 5,244,215
[45] Date of Patent: Sep. 14, 1993

[54] ROTARY SHAFT SEAL WITH RETRACTABLE EXCLUDER LIP

[75] Inventors: Douglas A. Cather, Jr.; Boyce J. Lear, Jr., both of Gastonia, N.C.

[73] Assignee: Chicago Rawhide Manufacturing Company, Elgin, Ill.

[21] Appl. No.: 875,597

[22] Filed: Apr. 28, 1992

Related U.S. Application Data

[63] Continuation of Ser. No. 131,311, Dec. 8, 1987, abandoned, which is a continuation of Ser. No. 732,566, May 10, 1985, abandoned.

[51] Int. Cl.$^5$ .............................. F16J 15/32
[52] U.S. Cl. .......................... 277/1; 277/9; 277/153
[58] Field of Search .............. 277/1, 9, 134, 152, 277/153

[56] References Cited

U.S. PATENT DOCUMENTS

| | | | |
|---|---|---|---|
| 2,760,802 | 8/1956 | Haley | 277/153 |
| 3,004,298 | 10/1961 | Haynie | 277/153 X |
| 3,005,648 | 10/1961 | Christensen | 277/1 X |
| 3,306,683 | 2/1967 | Denrins | 277/153 X |
| 4,243,232 | 1/1981 | Repella | 277/153 X |
| 4,531,747 | 7/1985 | Miura | 277/153 X |

FOREIGN PATENT DOCUMENTS

| | | | |
|---|---|---|---|
| 834627 | 2/1952 | Fed. Rep. of Germany | 277/153 |
| 949916 | 9/1956 | Fed. Rep. of Germany | 277/153 |
| 1296020 | 11/1972 | United Kingdom | 277/153 |

OTHER PUBLICATIONS

CR Industries: Oil Seals Master Size & Type, pp. 52–54 of Catalog 457010 issued May 1975 (Chicago Rawhide Manufacturing Co. 900 North Statt St., Elsin, Ill. 60120).

*Primary Examiner*—William A. Cuchlinski, Jr.
*Assistant Examiner*—Scott W. Cummings
*Attorney, Agent, or Firm*—Lockwood, Alex, FitzGibbon & Cummings

[57] ABSTRACT

A seal assembly is provided for retaining fluids within a sealed region defined in part by the seal assembly secured within an annular casing member and in part by a shaft extending axially through the seal assembly within the casing. The fluid seal assembly includes both a primary and a secondary lip arranged to facilitate easier, more reliable installation of the shaft therethrough. The primary and secondary lips are joined by a center section which is supported by a generally L-shaped support ring which extends to the casing to form the seal.

5 Claims, 2 Drawing Sheets

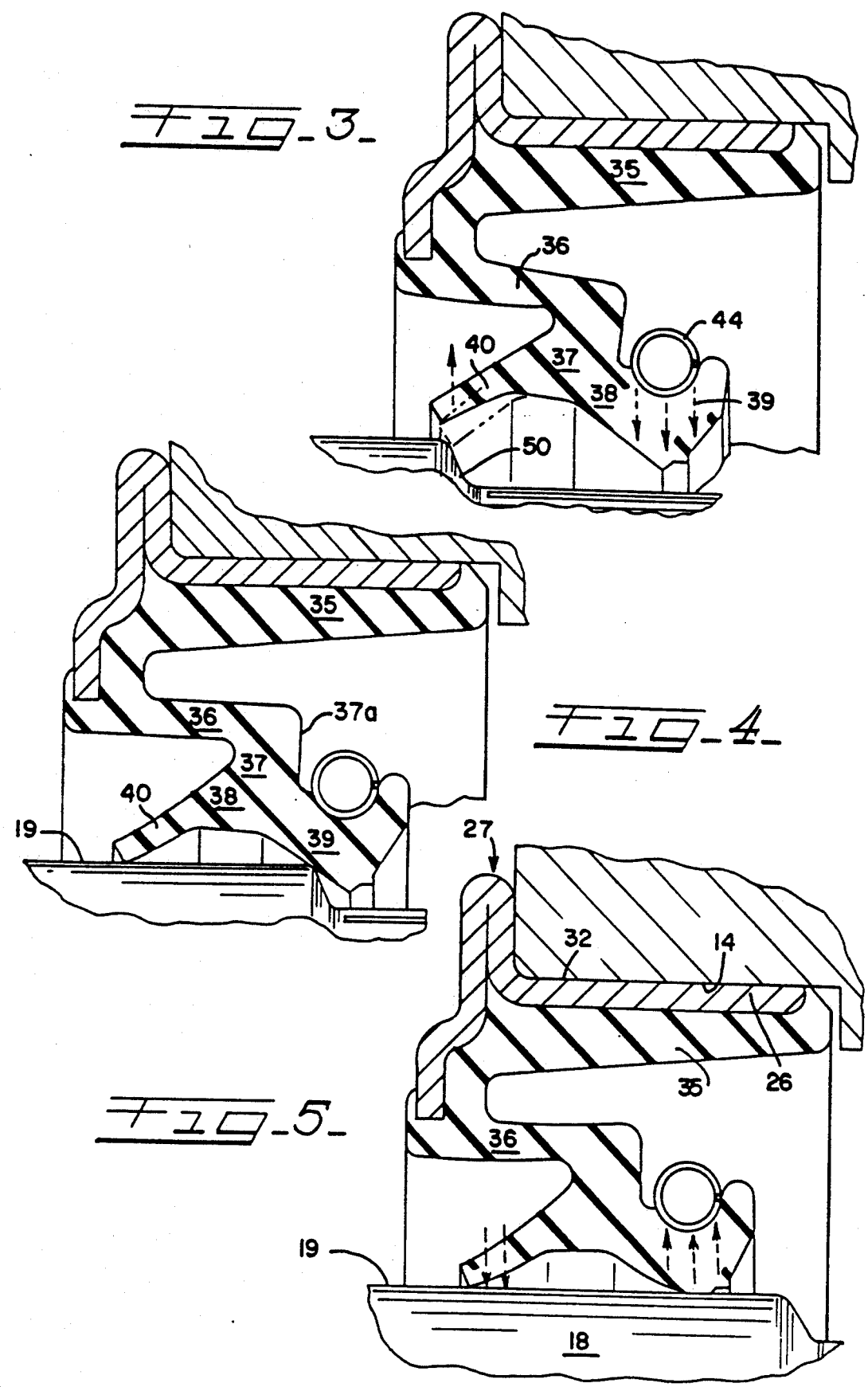

ROTARY SHAFT SEAL WITH RETRACTABLE EXCLUDER LIP

This application is a continuation of application Ser. No. 131,311, filed Dec. 8, 1987, which is in turn a continuation of application Ser. No. 732,566, filed May 10, 1985, all abandoned.

BACKGROUND OF THE INVENTION

The present invention relates generally to fluid seals, and more particularly, to a seal design in which the so-called primary lip and the so-called secondary or auxiliary lip are of a special construction and arrangement to insure improved performance in use as well as greatly facilitated ease of installation. According to the invention, an easier and more reliable installing method is provided, which is made possible by flexing of certain elements of the seal when it is installed.

Prior art fluid seals having both primary and secondary or excluder lips are well known to those skilled in the art. Basically, a "primary lip" is a radially acting seal lip defined in part by fluid and oil side frusto-conical surfaces which meet along a generally circular locus to define the primary seal band. The shaft or other sealed member extends axially through the openings just defined, and the primary seal band portion of the seal body snugly engages the lubricated shaft or the like passing thereto. The seal lip is urged into snug engagement by an annular garter spring in a groove in the primary lip body; this lip retains oil or other fluid on one side of the seal so that it does not leak axially of the shaft even during rotation thereof.

Another portion of the seal body customarily comprises a mass of elastomeric material bonded to a rigid metal or like casing. The casing itself is inserted in a counterbore or other opening in a mechanism to be sealed. The seal thus provides a secondary or static seal with the fixed or relatively immovable part of the sealed mechanism, while both primary and excluder dynamic rotary seals are provided between the relatively movable parts of the mechanism.

In addition to the primary lip, modern oil seals customarily include an "auxiliary", "excluder", or "secondary" lip. This lip is normally also defined by frusto-conical surfaces which meet to define a generally circular seal band, but the excluder lip has a different function and usually is somewhat different construction than the primary lip. Its principal purpose is to engage dust, grit, or another fluid, and prevents such foreign material from entering the space between the two seal bands, and ultimately, the space inside the sealed region. Often, the excluder lip runs either completely dry or relatively free of fluid. In some cases, the shaft being sealed is lubricated by slight weeping or like leakage, or is intentionally lubricated or packed with grease. In any case, it is normally of a larger diameter than the primary lip because its ability to be lubricated and to transfer heat away from the sealed region is impeded by lack of lubricating and cooling fluid.

A consequence of this is that many excluder seals often exclude only relatively larger particles, and even if sized so as to provide a snug interference fit with the shaft, the lack of good dynamic heat transfer paths along the sealed shaft cause the seal to be raised to a high temperature and abraded away rapidly, or embrittled by "post-curing."

Another aspect of known fluid seals is the difficulty involved in installing them, or parts associated with them, in place is their intended environments. During the last several years, there has been a greatly increasing trend towards more compact sealed mechanisms, such as those found on smaller automotive applications. These include front wheel drive transfer case mechanisms, for example.

In these installations, space is at a premium and installation of a seal is a difficult matter. Therefore, potential seal leakage is a serious matter and it is imperative that the seal be kept free from damage during the time it is being installed or when mating parts are being installed with it. Any damage which occurs in seal installation is a serious matter because, even though the seal itself is relatively inexpensive in terms of its own cost, replacement after assembly of the entire mechanism is prohibitively expensive in terms of the labor required to gain access to the seal. In this connection, nicking and gouging of the seal lip during component installation is more common than is desired, and in many cases, seems almost to be an inherent aspect of seal installation.

Still further, the relation between the respective diameters of the primary and secondary lips of the seal is such that installation is often difficult to accomplish without damage, that is, difficult to accomplish reliably according to specifications.

In one particular installation, for example, that of a transfer case, a part of the sealed mechanism is a stub shaft journaled in bearings within a housing having a counterbore in which the seal is installed. Therefore, on the assembly line, it is necessary to insert a mating part into the opening partially closed off by the seal cavity. The part to be inserted is typically a yoke or the like having a splined outer diameter which is to be engaged with a splined inner diameter surface on the stub shaft journaled within the housing. It is required to insert the yoke through the seal diameter from the outside or excluder lip portion of the seal after the seal is installed in the counterbore. Performing this operation or the assembly line creates significant risk of seal damage.

While it is more common to install a seal over a shaft extending out of a counterbore, in which case the primary lip passes over the sealed part first, it is not at all uncommon for a reverse assembly method to be utilized wherein the sealed part passes through the seal from outside the sealed region after the seal is already in place within the counterbore. The present invention is particularly advantageous in such circumstances.

In view of the difficulties of installing fluid seals in certain applications, it is an object of the present invention to provide a seal which is more easily and reliably installed in an intended application than counterpart prior art seals.

A further object of the invention is to provide a seal wherein the primary and secondary lips are joined by a common body center section portion, and wherein this body portion is attached to an annular ring with a radially extending web or flex section which permits relative movement of the primary and secondary lips of the seals relative to the shaft in a predetermined, desired manner.

Another object of the invention is to provide a seal assembly having a composite lip body which includes both primary and auxiliary or excluder lip bodies joined along a center section which is, in turn, affixed to the remainder of the seal body by a radial web section.

A still further object of the invention is to provide a novel seal wherein expanding the primary lip portion of the seal during installation results in a rocking effect which reduces the diameter of the auxiliary sealing lip in a transient manner, and wherein radial compression of the primary lip body results in transiently extending the diameter of the auxiliary or secondary lip.

Yet another object of the invention is to provide an improved method of installing an oil seal having primary and secondary lip portions joined at a central body and connected to the remainder of the seal assembly by a flexible radial web.

Another object of the invention is to provide a shaft seal which is adapted to provide ease of installation and flexibility in use, and in which the flexibility used to accommodate dynamic run out is accommodated principally or largely by a locating element between the seal bonding portion and the lip body, and wherein the seal body as a whole is adapted to rock or "bell-mouth" about such web, whereby radially compression of the primary lip acts to enlarge the diameter of the excluder lip, and radial compression of the excluder lip tends to enlarge the diameter of the primary lip.

Another object of the invention is to provide, in one embodiment of the invention, a radial lip oil seal wherein the seal body includes a relatively short primary lip area and a relatively extended excluder lip, joined by a lip center section forcing an extension of the radial support web, with the web being of relatively thicker cross-section than the cross section of the offsetting section to which it is attached, whereby forces created in inward movement of the primary lip seal band area are able to be transmitted through the body center section to create movement of the excluder lip.

The foregoing and other objects and advantages of the invention are achieved in practice by providing a seal having an annular casing, and an annular seal body disposed therein, with the seal body being subdivided into a bonding portion and a seal lip body portion, with the lip body portion being subdivided into primary and secondary lip units joined to each other along a common seal lip body center section, which in turn is joined to the bonding portion by an annular locating element which includes both an axially extending, flexible offset section and a support web extending radially between the seal body center section and the axially inner end of the flexible offset section.

The exact manner in which the foregoing and other objects and advantages of the invention are achieved in practice will become more clearly apparent when reference is made to the following detailed description of the preferred embodiments of the invention set forth by way for example, and shown in the accompanying drawings, wherein like reference numbers indicate corresponding parts throughout.

BRIEF DESCRIPTION OF THE DRAWINGS

FIG. 3 is a vertical sectional view of the seal of FIG. 2, showing the same in one position during an early step in the installation of a part in the associated sealed mechanism;

FIG. 4 is a view similar to FIG. 3, and showing a later stage of part installation; and FIG. 5 is a view similar to FIGS. 3 and 4, showing the part as finally installed.

DESCRIPTION OF THE PREFERRED EMBODIMENTS OF THE INVENTION

While it will be understood that seals made according to the invention may be made from different materials and have somewhat different forms, including those acting radially outwardly as well as the illustrated, radially inwardly acting form, and while it will be understood that the seal may have a primary lip portion which includes different forms of hydrodynamic or pumping elements associated therewith, or a fluorocarbon surface coating, for example, a description of the preferred form of seal will be given wherein the sealed medium is oil, whereas the seal acts inwardly, and wherein the machine member includes a seal-receiving counterbore and the sealed member is the stub shaft end of a rotary shaft yoke or the like extending into a housing forming a portion of the sealed mechanism.

Figure 1:
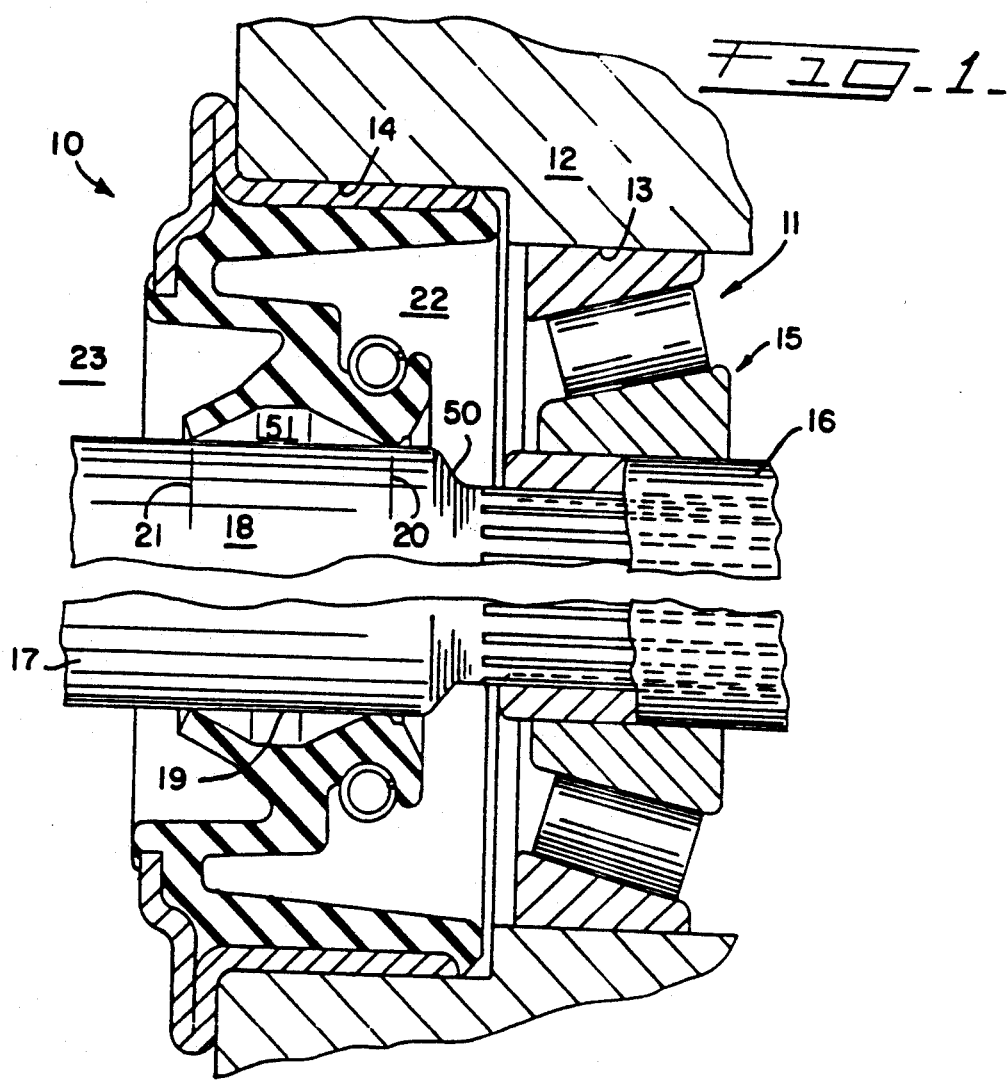
FIG. 1 is a cross-sectional view of the fluid seal unit embodying the invention, and showing the seal as installed in place within a sealed mechanism including a machine housing and a rotatable shaft.

Referring now to the drawings in greater detail, FIG. 1 shows the seal of the invention generally designated 10 embraced within a sealed mechanism generally designated 11 in the form of a housing 12 having a principal bore 13 extending therethrough. As shown, a counterbore 14 is also provided in the housing 12, which contains a bearing assembly 15 journaling an internally splined stub shaft 16 for rotation therein.

An externally splined yoke generally designated 17 has an inner stub section 18 with a finished exterior surface 19 adapted to be contacted in both primary and secondary seal band areas generally designated 20 and 21. The sealed region is shown as 22 and the exterior region as 23.

Figure 2:
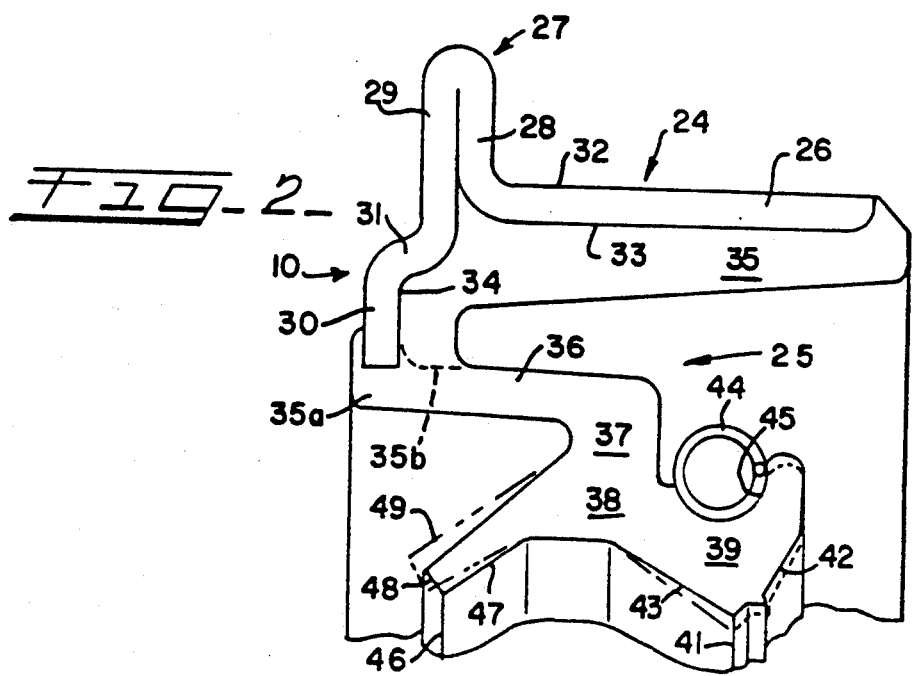
FIG. 2 is a fragmentary sectional view, taken on an enlarged scale, and showing certain construction features of the seal of the invention.

FIG. 2, shows the seal 10 to include two major components, a casing element generally designated 24, and an elastomeric component 25. While the casing may be of any suitable form, the casing 24 illustrated includes a generally axially extending mounting flange 26 having a folded over pry out flange generally designated 27 and is shown to include axially inner and outer, radially extending flange elements 28, 29, and a radially innermost heel element 30, connected by an offset portion 31 to the radially inner part of the flange element 29. The casing unit 24 includes, functionally speaking, a generally cylindrical outer diameter mounting surface 32 adapted for reception in the machine counterbore 14, and a pair of angularly related, inner elastomer bonding surfaces 33, 34.

The elastomer component 25 is subdivided into a number of principal assemblies, each having its own purpose, as will appear. For purposes of locating the novel flexible lip of the invention, the elastomeric component 25 includes a relatively massive, annular bonding element 35, having attached thereto at its radially inner end, means for locating the lip body, such means being in the form of a generally axially extending flexible offset section 36 attached at its axially innermost portion to a radially extending lip support web 37. The offset section 36 and the support web 37 are functionally related, and when considered together, may be referred to as a sealing lip element support ring of generally L-shaped cross-section. The web 37, which includes an axially inner surface 37 a terminates at its radially innermost portion by being joined to a lip center section 38, which lies between the primary or fluid sealing lip 39 and the auxiliary or dust excluder lip 40.

As is well known to those skilled in the art, the primary fluid seal lip 39 includes a seal band area 41 formed by the junction of so-called oil or fluid side and so-called air side frustoconical surfaces 42, 43. The primary lip 39, being made from a flexible elastomeric material, is able to be urged into a position closely overlying the associated stub shaft surface 19 by the radial compressive action of a garter spring 44 situated in an annular groove 45 formed in the primary lip body 39. The auxiliary or dust lip 40 also includes an auxiliary seal band 46 formed along the locus whereat the axially inner and axially outer frustoconical surfaces 47, 48 meet. The dust lip is further defined by a inclined annular surface 49 which extends radially outwardly and axially inwardly toward the body center section 38 and the lower portion of the radial web element 37.

In the use of the seal, the primary lip seal band 41 snugly engages the surface 19 of the stub shaft 18 forming the end of a yoke assembly (not shown) along the circular contact line 20 to retain fluid within the sealed region 22, shown as lying axially to the right of the seal 10 in FIG. 1. The auxilliary lip seal band 46, according to the invention, may be fit with at least a slight interference fit over such associated stub shaft 18, along the contact path 21. This advantage of the present invention is discussed below.

An important feature of the present invention is that the locating element comprising the flexible lip offset section 36 and the relatively thick, stiff web element 37 combine to provide a unique combination flexing and pivoting action which is helpful in installing the seal without damage, and which at the same time permits the seal to fit over the associated shaft with the proper degree of residual interference or radial force.

Referring now to FIG. 3, for example, it is shown in phantom lines that the auxillary lip 40 and the primary lip 39 are both designed to flex or pivot as a unit. The stiff center section 38 and the attachment of the web 37 to the end of the flexible offset element 36 permits the lips to flex inversely to each other. Thus, as shown in FIG. 3, prior to the time the installation is begun, the radial load shown by the arrows lying radially inwardly of the garter spring 45 distorts the primary lip 39 towards a smaller diameter. This creates an annular flexing or "bell-mouthing" action tending to open the seal band area 46 of the auxilliary lip body 40. The lip seal band 46 is deflected into a cone section of greater diameter than it would be in its relaxed condition.

This permits the outside diameter blank 19 of the associated shaft to be received within the seal without damaging it. In this connection, it will be noted that when the web 37 tilts from a planar to a frustoconical section (FIG. 3) this flexing or tilting is accommodated easily by deflection of the offsetting section 36. In use, the seal band 46 opens up from 0.030 inches up to 0.100 inches or more, permitting easy, non-damaging insertion of the shaft as shown in FIG. 3.

Referring now to FIG. 4, a view is shown of a further step in the installation, it being understood that the entire insertion of the shaft through the seal may be made in a matter of seconds or less. However, to illustrate the invention, FIG. 4 shows that once the nose or shoulder portion 50 of the shaft has passed through the auxilliary lip area, it engages an intermediate portion of the frustoconical air side surface 43 of the primary lip 39, thus urging the garter spring into a slightly withdrawn position and moving the seal band 41 gradually radially outwardly. (In FIGS. 3–5, these distances are shown as being somewhat exaggerated for purposes of illustration.) As the shaft nose 50 moves inwardly, both seal bands 41, 46 move in an inversed relation; one grows larger and the other smaller.

FIG. 5 shows that the seal band 41 has now reached its desired position of use, completely encircling the shaft. This action has slightly enlarged the primary lip body 39, and has also rocked the entire seal lip assembly, including the primary and secondary lips 39, 40 and the center section 38 in such a way that the auxilliary lip seal band 46 now is in snug interference fit or a slightly preloaded contact with the exterior surface 19 of the associated stub shaft 18. This is desirable, particularly where the general area shown as 51 in FIGS. 1 and 2 and is filled with grease or pre-lubricated, or where the shaft may have an intentionally or otherwise deposited film of oil or other lubricous material.

Often, in prior art seal designs, the auxilliary lip was required to be sized essentially too large for the shaft diameter, in order to guard against installation damage. In such case, the fit between the shaft and the auxilliary lip was too loose or constituted an actual gap.

In the present case, the nose of the shaft is initially inserted within the auxiliary lip when the auxiliary lip is retracted or withdrawn into spaced apart relationship to the adjacent shaft surface, by reason of the novel pivoting, tilting or retracting action. As the shaft is fully installed, the auxiliary lip pivots back into an interference fit relationship with the shaft, thereby permitting the shaft to be installed without damage and also permitting the installed seal to have an interference fit relationship along both the primary and auxiliary seal band areas. As used herein, by "retracted" is meant biased to a larger diameter. The provision of the combination lip and lip support element configuration provides this action.

According to the invention, extended wear as well as ease of installation is possible using seals made as described herein. The auxilliary lip maintains a tighter fit and is better able to exclude dust and debris from the primary lip area, and this tends to lengthen the primary lip life. A certain amount of residual stresses are accommodated in balancing the lip residual interference forces when the seal is installed, that is, the transfer of forces from one lip to the other is aided by the pivoting action of the design. This means that the radial load may be altered so as to be lightest during installation, and later balanced during use. Of course, the primary lip will normally have significantly greater interference and radial load, but the auxilliary lip may have a desired load for exclusion to operate satisfactorily as an excluder lip.

A folded over type casing 24 is advantageously used with the invention; however, other forms of mounting flanges or casings may be provided. The illustrated embodiment shows a radially inwardly acting seal, but it is understood that the principles of the invention may be applicable to seals in which the lips act radially outwardly, the rotary part lying outside of the radially outside of the sealing lips instead of inwardly thereof.

Also, in the drawings, a form of seal is illustrated wherein the bonding element 35 is relatively massive and extends along and even beyond the entire axial length of the inner surface 33 of a flange 26 of substantial length. However, it is not necessary to the practice of the invention that the bonding portion be of this size and configuration, nor is it necessary that the axial flange 26 extend the distance shown. It is within the scope of the invention to provide a much shorter flange, or, in certain cases, to have the seal located in the housing with respect to another part of the casing altogether. Likewise, the casing may or may not be covered with an elastomer on its outside diameter ("OD").

Accordingly, it is shown in FIG. 2 that the bonding portion of the elastomeric seal body may be relatively small and affixed merely as a tab to the heel portion 30 of the casing 24; in such case, the bonding portion 35a would be defined in part by a surface such as shown in the phantom line 35b.

The seal is designed for readily molding to facilitate manufacture, that is, for ease of removal from the mold after the product has been formed by insert molding in a known manner. The absence of undercuts of significant dimension helps provide this feature.

Hydrodynamic pumping elements may be provided on the lip surface 43, and a fluorocarbon surface may be applied to the lip, either by molding or by other known methods. In any case, the seal provides reliable and trouble-free installation, and improved performance in use.

It will thus be seen that the present invention provides a rotary seal with retractable excluder lip having a number of advantages and characteristics, including those pointed out herein and other which are inherent in the invention.

Several preferred embodiments having been described by way of example, it is anticipated that various changes and modifications to the described form of apparatus may be made by those skilled in the art without departing from the spirit of the invention or the scope of the appended claims.

We claim:

1. A method of installing and sealing a rotary machine element having a given outside diameter into an operative relationship with a mechanism which includes a machine housing, and an opening in said machine housing for receiving a rotary machine element, said method comprising disposing within said opening a seal assembly comprising, in combination, an annular casing element and an annular elastomeric body, said casing element being made from a relatively rigid material and having a cylindrical portion terminating in an axially inner free end and a radial flange portion which includes a radially extending bonding margin terminating in a radially inner free edge portion, said cylindrical portion being received in fluid-tight relation within a portion of said opening such that said free end lies toward the sealed portion of said mechanism, said annular elastomeric body including a bonding portion secured to said bonding margin of said casing, a sealing lip element including a primary sealing lip portion, an excluder lip portion, and a center body portion lying between said lip portions, and a sealing lip element support ring of generally L-shaped cross-section extending between and joining said bonding portion to said center body portion of said sealing lip element, said primary sealing lip portion having fluid and air side surfaces respectively of generally frusto-conical configuration meeting each other along a generally circular locus to define a primary seal band, said primary sealing lip portion further including an annular spring groove of a given width disposed generally radially outwardly of said seal band area, said excluder lip portion having a pair of partially radially inwardly directed surfaces, one being directed partially axially inwardly and the other partially axially outwardly, said excluder lip surfaces meeting each other along a generally circular locus to define an excluder lip seal band, said sealing lip element support ring having axial and radial legs, with said a radial leg having substantially greater cross-sectional thickness than the cross-sectional thickness of said axially extending leg, and with the axially inner surface of said support ring radial leg being spaced from an adjacent edge of said spring groove by a distance less than about said spring groove width, said method further including inserting said rotary machine element through said opening in said housing while rocking said sealing lip element about the plane occupied by said radial leg of said support ring, whereby each of said lips may expand and then contract to permit passage of said machine element, and whereby said lips may thereafter achieve snug contact with an outer surface of said machine element.

2. A seal assembly adapted to retain fluids within a sealed region defined in part by said seal and in part by a shaft extending axially through said seal, and to prevent foreign materials from entering said sealed region along the surface of said shaft, said seal assembly comprising, in combination, an annular casing element and an annular elastomeric body, said casing element being made from a relatively rigid material and having a cylindrical portion terminating in an axially inner free end and a radial flange portion which includes a radially extending bonding margin terminating in a radially inner free edge portion, said cylindrical portion being adapted to be received in fluid-tight relation within a portion of a mechanism to be sealed, said axially inner, free end lying toward said sealed portion of said mechanism to be sealed, said annular elastomeric body including a bonding portion secured to said bonding margin of said casing, a sealing lip element including a primary sealing lip portion, an excluder lip portion, and a center body portion lying between said lip portions, and a sealing lip element support ring of generally L-shaped cross-section extending between and joining said bonding portion to said center body portion having fluid and air side surfaces, respectively, of generally frusto-conical configuration meeting each other along a generally circular locus to define a primary seal band, said primary sealing lip portion further including an annular spring groove of a given width disposed generally radially outwardly of said seal band area, said excluder lip portion having a pair of partially radially inwardly directed surfaces, one being directed partially axially inwardly and the other partially axially outwardly, said excluder lip surfaces meeting each other along a generally circular locus to define an excluder lip seal band, said sealing lip element support ring having axial and radial legs, with said radial leg having substantially greater cross-sectional thickness of said axially extending leg, and with the axially inner surface of said support ring radial leg being spaced from an adjacent edge of said spring groove by a distance less than about said spring groove width.

3. A seal assembly as defined in claim 2, wherein said casing further includes a pry-out flange formed therein, said pry-out flange being formed between said bonding margin and said cylindrical portion of said casing and having at least one part thereof extending radially outwardly of said cylindrical portion and axially outwardly of said free end portion.

4. In a seal assembly adapted to retain fluids within a sealed region defined in art by said seal and in part by a shaft extending axially through said seal, and to prevent foreign materials from entering said sealed region along the surface of said shaft, said seal assembly comprising, in combination, an annular casing element and an annular elastomeric body, said casing element being made from a relatively rigid material and having a cylindrical portion terminating in an axially inner free end and a radial flange portion which includes a radially extending bonding margin terminating in a radially inner free edge portion, said cylindrical portion being adapted to be received in fluid-tight relation within a portion of mechanism to be sealed, said axially inner, free end lying toward said portion of said mechanism to be sealed, said annular elastomeric body including a bonding portion secured to said bonding margin of said casing, a sealing lip element including a primary sealing lip portion having fluid and air side surfaces respectively of generally frusto-conical configuration meeting each other along a generally circular locus to define a primary seal band, said primary sealing lip portion further including an annular spring groove of a given width disposed generally radially outwardly of said seal band area, an excluder lip portion having a pair of partially radially inwardly directed surfaces, one being directed partially axially inwardly and the other partially axially outwardly, said excluder lip surfaces meeting each other along a generally circular locus to define an excluder lip seal band, and a center body portion lying between said lip portions, the improvement comprising a sealing lip element support ring of generally L-shaped cross-section extending between and joining said bonding portion to said center body portion of said sealing lip element, said sealing lip element support ring having axial and radial legs, with said radial leg having substantially greater cross-sectional thickness than the cross-sectional thickness of said axially extending leg, and with the axially inner surface of said support ring radial leg being spaced from an adjacent edge of said spring groove by a distance less than about said spring groove width.

5. An improved seal assembly as defined in claim 4, wherein said casing further includes a pry-out formed therein, said pry-out flange being formed between said bonding portion and said cylindrical portion and having at least a part thereof extending radially outwardly of said cylindrical portion and axially outwardly of said free end portion.

* * * * *